United States Patent [19]

Cheng

[11] 4,330,702
[45] May 18, 1982

[54] ELECTRONIC CONTROL SYSTEM FOR COFFEEMAKER

[75] Inventor: Chung-Kae C. Cheng, Hamden, Conn.

[73] Assignee: General Electric Company, New York, N.Y.

[21] Appl. No.: 199,048

[22] Filed: Oct. 20, 1980

[51] Int. Cl.³ .............................................. H05B 1/02
[52] U.S. Cl. ................................ 219/492; 219/493; 219/501; 219/491; 219/442; 99/281; 99/283
[58] Field of Search ............... 219/490, 491, 492, 493, 219/494, 497, 501, 507, 508, 441, 506, 442, 435; 99/281, 280, 283; 307/117

[56] References Cited

U.S. PATENT DOCUMENTS

| | | | |
|---|---|---|---|
| 3,888,075 | 6/1975 | Wecker | 219/441 |
| 3,969,610 | 7/1976 | Ratti et al. | 219/441 |
| 4,069,750 | 1/1978 | Kemp | 219/441 |
| 4,155,291 | 5/1979 | Ryckman, Jr. et al. | 219/441 |

OTHER PUBLICATIONS

"SCR Manual" G.E., pp. 110-111, 74.

Nationa Semiconductor, C 1978 FEPM-0091, MA1040/1042/1043 Series.

Primary Examiner—B. A. Reynolds
Assistant Examiner—M. H. Paschall
Attorney, Agent, or Firm—Leonard J. Platt; George R. Powers; John F. Cullen

[57] ABSTRACT

A coffeemaker is provided with a power circuit and a control circuit. The power circuit is connected to a household source of electric power and it is activated by a relay switch. The control circuit includes a relay coil for the switch, and a triac that may be triggered into conduction when a turn on signal from an electronic timer module is applied to the control terminal of the triac simultaneously with the application of direct current control circuit voltage across the triac. Thereafter, the triac remains in its conductive state so long as the direct current flowing through the triac remains above a minimum level. Subsequent removal of the turn on signal from the control terminal of the triac has no effect on the operation of the power circuit which includes the coffeemaker heating means so long as the direct current flowing through the triac remains above a minimum level.

11 Claims, 3 Drawing Figures

ELECTRONIC CONTROL SYSTEM FOR COFFEEMAKER

BACKGROUND OF THE INVENTION

1. Field of the Invention

This invention relates to an automatic drip coffeemaker, and more particularly to an improved heating and control means for starting a brewing cycle at a pre-set time and for maintaining the brewed coffee at a suitable serving temperature for an indefinite period of time after it has been brewed.

2. Description of the Prior Art

Drip brewing apparatus for coffee is well known. A molded plastic housing is conventionally provided with a horizontal base for holding a receptacle such as a glass carafe. A generally vertical wall is integrally molded with the base and is provided with an overhanging top wall located above the carafe for holding a coffee brew basket. The basket is filled with dry ground coffee and then positioned on the underside of the top wall of the housing. A water reservoir is provided in the generally vertical wall and an electric heater is positioned in the plastic base below the carafe for delivering heated water through an opening in the top wall of the housing and into the coffee brew basket. The heated water flows through the grounds and brewed coffee drips into the carafe receptacle. The base mounted heater performs a dual function in supplying the pumping action to move the water through its cycle as well as keeping the brewed coffee hot.

It is common practice to provide a thermostatic switch in heat exchange relation with a water tube of the heater for both sensing the temperature of the water in the tube and the temperature of the brewed coffee in the carafe that is positioned on the base above the heater.

In a prior U.S. Pat. No. 4,069,750 to Kemp dated Jan. 24, 1978 an analog timer with gears and levers is provided for automatically closing a switch to start operation of the coffeemaker at a pre-set brew time, and maintaining the coffee warm after it has been brewed. A manually operable lever 40 of an ON OFF AUTO switch is provided to terminate the keep warm cycle of the coffeemaker.

Low cost digital LED clock modules are available for use as clock radio timers and appliance timers. A prior digital LED clock module, manufactured by National Semiconductor Corporation, and identified as MA1010/1042/1043 Series is such a timer, which has been particularly designed as a clock radio timer and is also available for use as an appliance timer. However, the output signals from the timer are not directly usable for controlling a drip coffeemaker since one signal SLEEP OUTPUT is removed after 59 minutes, which may be shorter than a desired coffee keep warm time, and the usual ALARM OUTPUT signal for actuating an alarm clock radio is an oscillating signal for driving a speaker. Thus, it is not readily usuable actuating a control circuit for a coffeemaker, wherein a steady state direct current signal is desired.

SUMMARY OF THE INVENTION

This invention is concerned with an electric drip coffeemaker such as the coffeemaker shown in the aforementioned U.S. Pat. No. 4,069,750 and an off-the-shelf clock module such as the aforementioned National Semiconductor clock module, and more particularly to an improved heating and control means that may utilize an output of such an off-the-shelf timer, and yet permits a keep cycle longer than 59 minutes without requiring the use of a specially designed timer or a complex latching relay system.

Accordingly, it is a primary object of my invention provide an improved heating and control means for a coffeemaker that may be actuated by a turn-on signal from an off-the-shelf timer to control the coffeemaker for an indefinite period of time after removal of the turn-on signal so long as power is being supplied to the improved heating and control means.

It is the further object of my invention to incorporate a low cost electronic clock module into a drip coffeemaker with the use of relatively few additional electronic components, which may be readily manufactured into an electronic timer drip coffeemaker combination.

Briefly stated, in carrying out the invention in one form, my improved heating and control means for a coffeemaker includes a power circuit and a control circuit. The power circuit is connected to a source of electric power and it includes heating means and a first switching means that has a normally non-conductive state and a conductive state. The control circuit is connected to a source of direct current electric power which may be supplied by a transformer and two rectifier diodes, or some other direct current source. The control circuit includes an activating means for the first switching means and a semiconductor switching means such as a triac, SCR, or other suitable solid state device. The semiconductor switching means has a normally non-conductive state and a conductive state and a control terminal. The semiconductor switch assumes its conductive state only when a turn-on signal is applied to the control terminal simultaneously with the application of direct current voltage across the semiconductor switch and the semiconductor switch thereafter remains in its conductive state so long as the direct current flowing through the control circuit remains above a minimum level. The activating means, which could take the form of a relay coil, is operatively connected to the first switching means, which could be the contacts of a relay to place and maintain the first switching means in its conductive state only in response to flow of electric current through the control circuit and the activating means. Means such as an output from an electronic timer is provided for supplying a turn-on signal to the control terminal of the semiconductor switching means when heating of the coffeemaker is desired.

With this circuit subsequent removal of the turn-on signal from the control terminal of the semiconductor switching means has no effect on the operation of the power circuit and the heating means so long as the direct current flowing through the control circuit remains above a minimum level.

By a further aspect of this invention, a manually operated switching means such as low cost direct current ON OFF AUTO switch may be connected in series with the semiconductor switching means. The manually operated switching means has a non-conductive and a conductive state so that heating of the coffeemaker may be prevented or terminated by manually adjusting the manually operated switching means so as to prevent the flow of direct current through the control circuit.

Accordingly, with my unique circuit an output signal from an off-the-shelf electronic timer may start the coffeemaker at the desired TIME BREW, and the coffee may be kept warm for a period of time which is totally within the control of the user. Whenever it is desired to turn off the coffeemaker, whether it be within the short interval of time of up to 59 minutes or longer than 59 minutes the user simply moves the ON OFF AUTO selector switch to its OFF position.

In accordance with still further aspects of the invention, a low cost direct current electric power source that merely has a rectified low voltage sine wave as a low voltage source for control purposes may be selected since the low voltage rectified sine wave current is all that would be necessary to flow through a solid state device such as a triac to keep its conducitve mode after its gate has been triggered by the SLEEP OUTPUT (BREW TIME) signal of the off-the-shelf electronic timer. With such a circuit, the impedance of a relay coil activating means would be sufficient to maintain the current through said solid state device above a level so that the solid state device keeps its conductive mode although the turn-on signal is removed from the solid state device.

With this unique simplified low cost construction, an off-the-shelf electronic timer may be used for controlling the operation of a drip coffeemaker with relatively few additional parts. The only significant additional components are a semiconductor switch such as a triac or SCR and a relay. An ON OFF AUTO switch would normally be required with an electronic timer, while a control means in series with the resistance wire of a heater for a drip coffeemaker would normally be required for controlling the operation of any drip coffeemaker.

BRIEF DESCRIPTION OF THE DRAWING

While the novel features of the invention are set forth with particularity in the appended claims, the invention both as to organization and content, will be better understood and appreciated along with other objects and features thereof from the following detailed description taken in connection with the accompanying drawing in which:

DESCRIPTION OF THE PREFERRED EMBODIMENT

Figure 1:
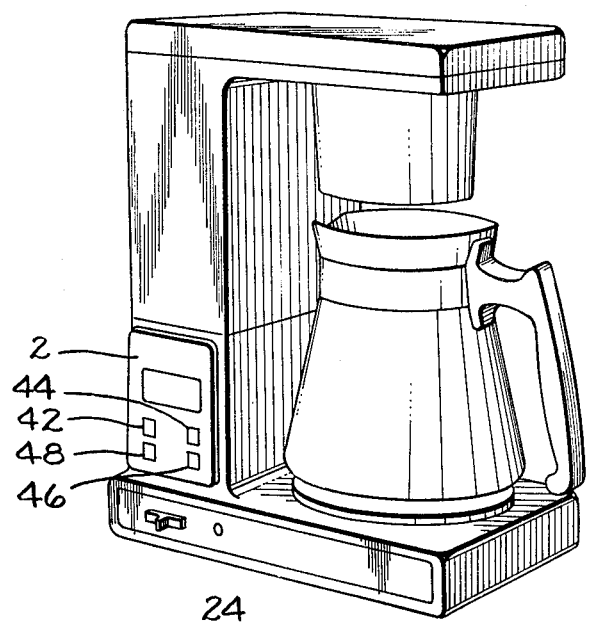
FIG. 1 is a perspective view of a coffeemaker incorporating the electronic timer and improved control circuit of this invention.
Figure 2:
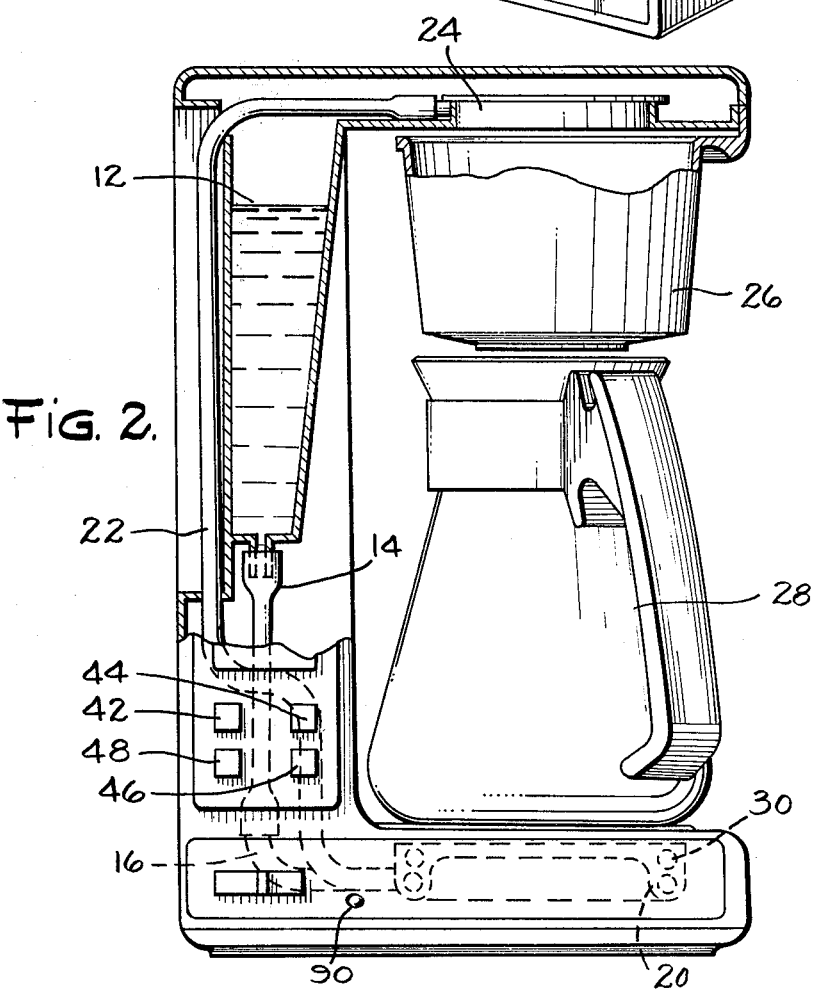
FIG. 2 is a front elevational view of the coffeemaker illustrated in FIG. 1 having portions broken away and other portions shown in section for illustrating the water flow path within the coffeemaker.

Referring now to the drawing and first particularly to FIGS. 1 and 2 there is shown an electric drip coffeemaker which includes my improved heating and control means that may use a turn on signal from an electronic timer having a SLEEP OUTPUT signal of a time interval of 59 minutes. The coffeemaker includes a container 12 for receiving cold water through a fill opening prior to initiation of the brewing cycle. As shown a flexible conduit 14 may be connected to the bottom of the container 12 and to the inlet of a water heater tube 16 to permit cold water from the reservoir to flow to the heater 20 where it is heated and pumped through a conduit 22, through a spreader 24, through grounds in a basket 26, and into a carafe 28.

WATER HEATER

Figure 3:
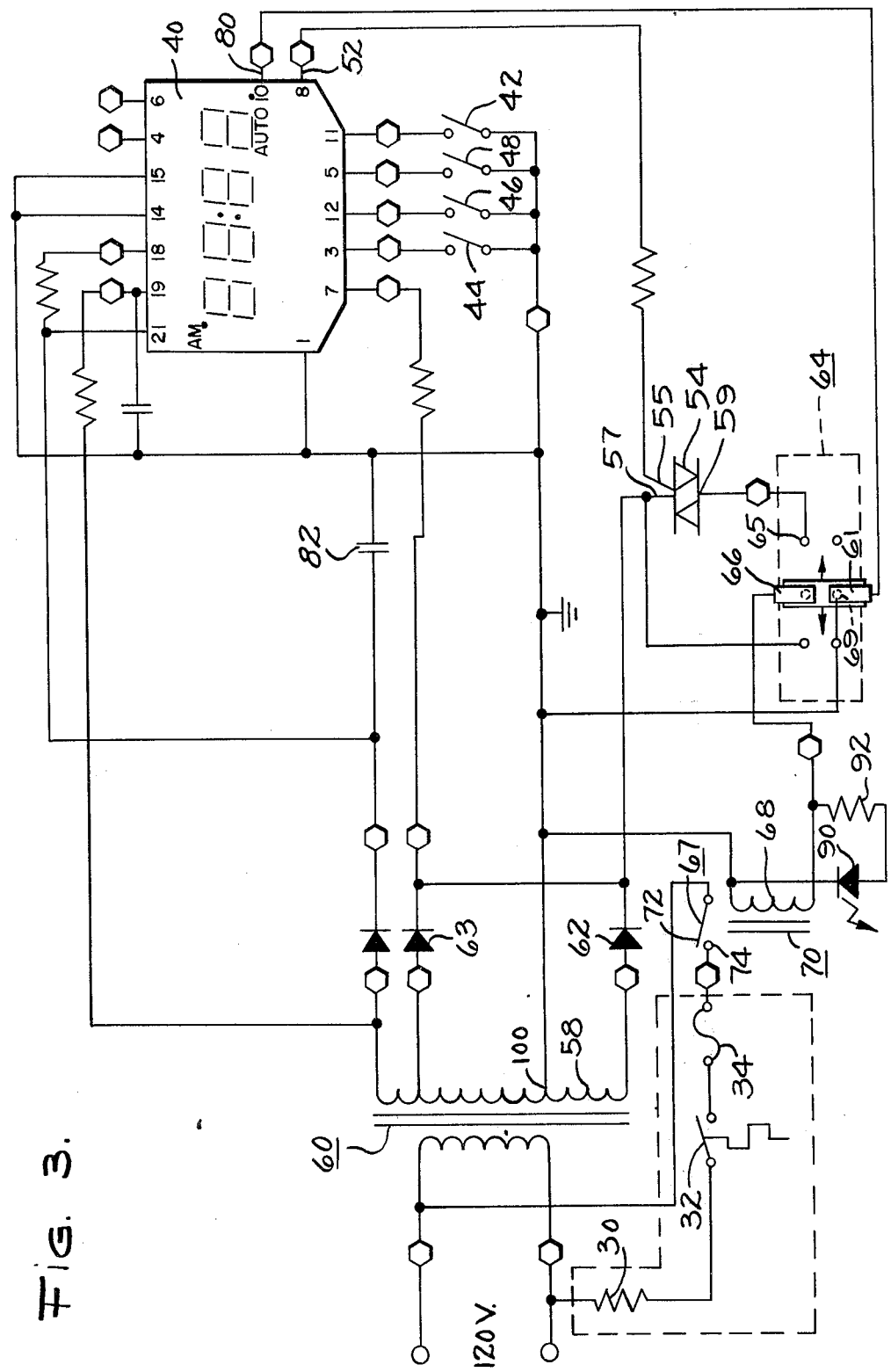
FIG. 3 is a schematic diagram showing the electric circuit of the coffeemaker heater, portions of the electronic circuit of the electronic timer, and the improved heating and control circuit of my invention.

As illustrated in FIGS. 2 and 3 the coffeemaker heater includes a sheathed electric resistance wire 30 that is positioned in a casting above the water tube 16. The casting and the resistance wire 30 are positioned directly below the carafe 28 containing brewed coffee so that the resistance wire serves the dual function of pumping water from the reservoir 12 through conduit 22 to the coffee grounds basket 26 and for keeping coffee warm in the carafe 28 after it has been brewed. As shown in the dotted line box in FIG. 3, the coffeemaker heater circuit for controlling the sheathed electric resistance wire may include a thermal switch 32 which cycles on and off for maintaining a desired brew temperature and a thermal fuse 34 as a safety precaution.

ELECTRONIC DIGITAL CLOCK TIMER

An off-the-shelf low cost digital LED clock timer manufactured by National Semiconductor Corporation is shown in the upper right hand portion of FIG. 3. The timer is similar to other low cost digital LED clock modules manufactured by the National Semiconductor Corporation and identified as their MA1040/1042/1043 Series. The details of the electronic clock timer do not form a part of this invention and therefore only so much of the timer as is required for understanding the application of the electronic timer with my unique circuitry for controlling a drip coffeemaker will be set forth hereinafter.

As shown in FIG. 3, the timer includes a four digit LED display 40 for indicating the time of day. Such an off-the-shelf timer has particularly been designed for controlling the operation of an alarm clock radio and in the discussion that follows clock radio nomenclature will be used with drip coffeemaker nomenclature in parenthesis.

A number of inputs are provided for setting the clock and for setting the ALARM TIME (TIME BREW). Conventionally, the timer includes a TIME NOW button 42 which may be depressed along with a fast set button 44 or a slow set button 46 for setting the clock to the correct time. The timer also includes an ALARM TIME (TIME BREW) button 48 which may be depressed along with the FAST SET or the SLOW SET button for setting the ALARM TIME or the time at which it is desired to start the drip coffeemaker (TIME BREW). The timer is mounted on a printed circuit board and includes a number of output pins that provide signals for performing various functions for a clock radio timer. An ALARM OUTPUT is provided for sending an oscillating signal or alarm tone to a speaker when coincidence occurs between the alarm counter and the real time counter. Thus, in a clock radio the alarm may be sounded at the alarm time.

The timer also includes a SLEEP OUTPUT pin 52. When a radio has been turned on at the ALARM TIME, the SLEEP OUTPUT 52 can be used to turn off the radio after a desired time interval of up to 59 minutes. Both the ALARM OUTPUT and the SLEEP OUTPUT 52 are activated or triggered at the ALARM TIME (TIME BREW) which has been previously set. The SLEEP OUTPUT 52 at the instant of ALARM TIME is a low voltage output close to ground voltage.

While it might appear to be straight forward to use the ALARM OUTPUT as a turn on signal for my improved heating and control means, I have selected the SLEEP OUTPUT signal from pin 52 caue of the desirable parameters of the signal. The SLEEP OUTPUT signal of such an off-the-shelf clock module is desirable because the signal is a continuous steady state low voltage output that is automatically provided at the instant when coincidence occurs between the alarm counter (BREW TIME) and the real time counter. Thus, the problems inherent in an oscillating signal that appears at the ALARM OUTPUT of such an off-the-shelf clock module at the instant of ALARM TIME are obviated. However, the SLEEP OUTPUT is conventionally used for energizing a radio at the pre-set ALARM TIME to permit the radio to play only for a short time interval up to 59 minutes. Thus, the sleep output provides a low voltage steady state current signal for a time interval of only 59 minutes after the alarm time. Since a user may wish to keep the brewed coffee warm for hours, the 59 minute signal is undesirable and a problem addressed by my invention is how to permit a keep warm cycle time longer than 59 minutes without requiring the use of either a specially designed timer or a complex latching relay.

In accordance with my invention, I have provided a control circuit that may be actuated by a turn-on signal such as the SLEEP OUTPUT 52 signal of the aforementioned electronic timer. The removal of the turn-on signal from the control circuit has no effect on the operation of a power circuit and a coffeemaker heating means that have been turned on by the control circuit so long as power continues to be supplied to my improved control circuit. As shown more particularly in FIG. 3, the power circuit is a seris circuit that comprises the electric resistance wire heating means 30, a first switch 67 having a normally non-conductive state and a conductive state, thermal switch 32, thermal fuse 34 and the 120 volt power source. As illustrated, the switch 67 includes contacts 72 and 74 of a relay 70 having a coil activating means 68.

The control circuit of my improved heating and control means includes a semiconductor switching means such as a triac 54 that may be triggered into conduction by a turn-on signal from output 52 but continues to conduct after the turn-on signal has been removed so long as the direct current flowing through the triac 54 remains above a minimum level.

Thus, as shown in FIG. 3, the control terminal gate 55 of triac 54 is placed in series with the SLEEP OUTPUT pin 52 of the electronic timer to permit the SLEEP OUTPUT signal to trigger the triac semiconductor switching device 54 into conduction. The triac continues to conduct from a low voltage direct current source after the steady state low voltage signal from the SLEEP OUTPUT 52 is removed after 59 minutes. In the embodiment illustrated, the signal from pin 52 acts through an 820 ohm resistor 53.

The triac semiconductor switch 54 assumes its conductive state only when a turn-on signal is supplied to the control terminal gate 55 simultaneously with the application of direct current voltage across the triac 60 semiconductor switch. For economic considerations, the current electric power supplied to my triac semiconductor switching means 54 and activating relay coil means 68 is a rectified sine wave. The direct current electric power supply includes a coil 58 of a transformer 60 which is connected to a conventional 120 volt household power supply. The low voltage sine wave from the transformer is full wave rectified by diodes 62 and 63 to apply direct current voltage across the semiconductor triac switching means. Thus, the triac 54 assumes its conductive state when a turn-on signal is supplied to the control terminal gate 55 simultaneously with the application of rectified DC voltage across the semiconductor triac switch. The triac 54 remains in its conductive state so long as the direct current flowing through the control circuit including the triac 54 and the relay coil 68 remains above a minimum level.

In the embodiment illustrated, during operation a positive voltage of approximately 5.2 volts is applied to the input terminal 57 of triac 54. When a trigger signal of zero volt is applied to the control terminal 55 of the triac through the limiting resistor 53, the triac turns on and completes the control circuit through relay coil 68; voltage at triac terminal 59 is then about 4.4 volts and control terminal gate 55 is about 4.5 volts. All voltages are RMS value and are with reference to a common point 100 at coil 58.

As shown, the control circuit is a series circuit that includes power supply coil 58, diodes 62 and 63, triac 54, selector switch 64, and relay coil 68 which is in parallel with LED 90 and resistor 92.

While an SCR or other thyristors might be selected to be triggered by an output of the electronic timer for controlling the coffeemaker, I have selected a triac since the triac may be readily triggered into conduction by the low voltage steady state signal from the SLEEP OUTPUT 52 of the aforementioned timer module.

The manually operable selector switch 64 has conductive and non-conductive states so that heating of the coffeemaker may be prevented or terminated by manually adjusting the manually operated switching means to its non-conductive state (OFF position) in order to prevent the flow of rectified direct current through the control circuit.

As shown in FIG. 3, the manually operable selector switch may take the form of a conventional ON-OFF AUTO low voltage radio alarm clock switch. Thus with the switch in the AUTO position with the movable contact 66 on the AUTO contact 65, at the pre-set TIME BREW a steady state low voltage turn-on signal is supplied from the sleep output pin 52 to the gate 55 of triac 54. This turns on the triac to permit low voltage rectified DC current to flow through the triac through the AUTO contacts of the selector switch to the relay coil 68 to close the relay contacts 72 and 74 and thereby start the brewing cycle. After 59 minutes the turn on signal from pin 52 is removed but the triac continues to conduct and the heater 30 therefore continues to keep the coffee warm. When the user desires to terminate the keep warm cycle he merely moves the selector switch 64 to its OFF position, which prevents the flow of direct current through the triac 54, de-energizes the relay coil 68 and causes contacts 72 and 74 to open. Simultaneously, it can be seen that the OFF contact 69 and movable contact 61 are connected to the low voltage side of coil 58. Thus, the low voltage is connected to the alarm off pin 80 input of the electronic timer to reset the alarm. This removes the low voltage turn on signal from pin 52 to the triac in the event that the selector switch is moved to its OFF position within 59 minutes of the initial turn on time.

With this circuit, while it is only necessary to trigger the triac 54 for a very short interval of time to start the flow of rectified DC through the triac, during the 59 minute period the sleep output from pin 52 triggers the triac continuously.

In accordance with the internal parameters of the low cost clock timer module, if a household power interruption of less than three seconds occurs during the first 59 minutes of the automatic brewing operation, the triac 54 will be retriggered when power returns because the clock module is maintained in its current function by a capacitor 82 up to three seconds. However with a househole power interruption after the 59 minutes, the triac 54 will block power to the relay since the triac 54 will not be trigered into conduction, by an output from pin 52.

In accordance with a further aspect of my invention, an LED 90 and a resistor 92 is placed in series with the triac 54 and in parallel with the relay coil 68. The LED functions as an indicator light to indicate that household electric power is being supplied to the resistance wire 30 to maintain a desired liquid temperature. The relay's impedance and the LED lamp's resistance maintain the current through the input and output terminals of the triac above a level so that the triac keeps its conductive mode. As a result, the relay contacts 72 and 74 are maintained closed through the brewing and keep warm operations until the selector switch 64 is reset manually to the OFF position. Thus, assuming that the household power is not interrupted, once the triac 54 is triggered by the sleep output signal from pin 52, the triac will continue to conduct and maintain the relay switch contacts 72 and 74 closed until it is turned off by movement of the selector switch 64 to the OFF position.

With reference to FIG. 3, the movable contact 66 of the selector switch 64 may be moved to its ON position at any time in order to by pass triac 54 and apply rectified DC to relay coil 68 in order to close relay contacts 72 and 74 when heating of the coffeemaker is desired.

OPERATION

The operation of the coffeemaker will now be described. Upon placing water in the container 12 and connecting the coffeemaker to a source of household power, the switch 64 will be in its closed or OFF position. Then the clock is set by activating the TIME NOW, FAST SET, and SLOW SET buttons 42, 44, and 46 respectively, in a conventional manner. The time for starting the brew cycle is set by depressing the TIME BREW button 48 and alternately the FAST SET and SLOW SET buttons with the TIME BREW button in its depressed position until the desired brewing time appears on the display.

The clock display will continue to operate during the evening and early morning hours displaying the correct time, and at the pre-set TIME BREW the off-the-shelf timer module will automaticaly provide a low voltage output at the SLEEP OUTPUT pin 52. This low voltage signal simultaneously acts through the 820 ohm resistor 53 to turn on the triac 54 that provides a turn on function to the control circuit including the triac 54 and the activating relay coil 68. Naturally with the coil 68 energized contacts 72 and 74 will be closed to permit power from the 120 volt supply to flow from the 120 volt supply through the contacts 72-74 through the thermal switch 32 and through the heater 30.

With the heater energized drip coffee will be brewed in a conventional manner. Water from the reservoir 12 will flow through passage 14 to the water tube 16 adjacent to the heater 30. Heated water will flow upwardly through tube 22, through a spreader 24 and through grounds in the coffeemaker basket 26. Brewed coffee will drip into the carafe 28 that is positioned on top of the heater 30. After all of the water from the container 12 has been pumped from the tube 22 adjacent to the heater through the coffee grounds and into the carafe 28, the heater 30 will continue to heat the brewed coffee within the carafe until the temperature adjacent the thermal switch 32 reaches approximately 88 degrees Celsius. At that time, the thermal switch will open to de-energize the heater 30 but the contacts 72, 74 will remain closed since the control circuit through the triac to the activating relay coil 68 will remain completed.

Thus, with my unique use of a triac 54 in a control circuit between the off-the-shelf clock module and the drip coffeemaker heater, the heater will continue to be cyclically energized by the thermal switch 32 although the low voltage signal from the conventional SLEEP OUTPUT 52 is removed after 59 minutes. Accordingly, the brewed coffee will be kept warm for more than 59 minutes as long as desired.

When the user desires to terminate the keep warm cycle, he merely moves the selector switch from AUTO to OFF. This breaks the circuit to the relay coil 68 and causes contacts 72, 74 to open. Simultaneously, an alarm off signal is supplied to the alarm off pin 80 of the off-the-shelf timer from the low voltage control circuit through the OFF contact 69 and movable contact 61 to reset the module including the output of the SLEEP OUTPUT pin 52. Thus, the output from the SLEEP OUTPUT pin 52 goes from a low voltage to a higher voltage and the turn on signal to the triac 54 is removed.

It will thus be seen that this invention provides a unique coffeemaker control circuit that requires only an activating means and a first switch which could take the form of a relay coil and its switch and a semiconductor such as a triac or SCR in addition to components that would normally be provided in an off-the-shelf electronic timer module and an electric drip coffeemaker.

While the invention has been particularly shown and described with reference to a preferred embodiment thereof, it will be understood by those skilled in the art that various changes in details and applications may be made therein without departing from the spirit and scope of the invention. For example, it would be possible to use an SCR in place of a triac as the semiconductor switch that is triggered by an output from a off-the-shelf electronic timer. An SCR would be particularly useful with an electronic timer module that provides an output where the voltage goes from low to high at a pre-set time. It is, of course, intended to cover all such modifications and changes by the appended claims.

I claim:

1. In a coffeemaker, improved heating and control means comprising:
   (a) a power circuit for connection to a source of electric power, said power circuit comprising heating means and a first switching means having a normally non-conductive state and a conductive state;
   (b) a control circuit for connection to a source to direct current electric power, said control circuit comprising activating means and a semiconductor switching means having a normally non-conductive state and a conductive state, said semiconductor switching means having a control terminal and assuming its conductive state only when a turn on signal is supplied to said control terminal simultaneously with the application of direct current voltage across said semiconductor switching means and said semiconductor switching means thereafter remaining in its conductive state so long as the direct current flowing through said control circuit remains above a minimum level;

(c) said activating means being operatively connected to said first switching means to place and maintain said first switching means in its conductive state only in response to flow of electric current through said control circuit and said activating means; and (d) means for supplying a turn-on signal to said control terminal of said semiconductor switching means when heating of the coffeemaker is desired, whereby subsequent removal of the turn-on signal from said control terminal has no effect on operation of said power circuit and said heating means so long as the direct current flowing through said control circuit remains above said minimum level.

2. A coffeemaker heating and control means as defined by claim 1 in which said control circuit further comprises a manually operated switching means connected in series with said semiconductor switching means, said manually operated switching means having non-conductive and conductive states whereby heating of the coffeemaker may be prevented or terminated by manually adjusting said manually operated switching means to its non-conductive states so as to prevent the flow of direct current through said control circuit.

3. A coffeemaker heating and control means as defined by claim 1 further comprising power supply means having input means for connection to a source of household electric power and output means coupled to said power and control circuits for supplying electric power thereto.

4. A coffeemaker heating and control means as defined by claim 3 in which said power supply means includes rectifying means for converting alternating current household electric power to direct current electric power for delivery to said control circuit, said heating and control means further including reactive circuit means for maintaining the direct current flowing through said control circuit above said minimum level when heating of the coffeemaker is desired.

5. A coffeemaker heating and control means as defined by claim 4 which said activating means and said first switching means comprises a relay switching means, the coil of said relay switching means comprising the reactive circuit means for maintaining the direct current flowing through said control circuit above said level when heating of the coffeemaker is desired.

6. In a liquid heating device of the type having a heater including an electrical resistance wire connected to a household electric power supply for heating liquid and for keeping the liquid warm after it has been heated, and a heater control means in series with said resistance wire to maintain a desired liquid temperature, an improved heating and control circuit comprising:

(a) an electronic timer of the type wherein a signal is provided at an output at a pre-set start time for an interval of time;

(b) a control current source;

(c) a relay including a relay coil and relay contacts, said relay contacts being in series with said heater control means and said power supply;

(d) a solid state device for closing said relay contacts at the pre-set start time and keeping said relay closed for a period of time longer or shorter than said interval of time, said solid state device having a control gate, the coil of said relay and said control current source being in series relationship with said solid state device, and said output of said electronic timer being connected to the gate of said solid state device to provide a turn on signal to said solid state device such that current will continue to flow through said solid state device and the relay coil from said control current source although the turn on signal is removed from said output after said predetermined interval of time whereby the relay remains latched after the turn on signal has been removed to permit said control means to continue to control said heater to maintain a desired liquid temperature; and (e) a manually operable selector switch in series with said solid state device and said relay coil for opening the circuit from said solid state device to said relay coil to turn off the solid state device and open the relay contacts which shuts off power to the liquid heater.

7. A liquid heating device as defined in claim 6 wherein an LED and a resistor are in series with said solid state device and in parallel with the relay coil so that said relay coil, LED and resistor circuit maintain the current level through the solid state device above a level so that the solid state device keeps its conductive mode, said LED also functioning as an indicator light to indicate that household electric power is being supplied to the resistance wire to maintain a desired liquid temperature.

8. In a liquid heating device of the type having a heater including an electrical resistance wire connected to a household electric power supply for heating liquid and for keeping the liquid warm after it has been heated, and a control means in series with said resistance wire to maintain a desired liquid temperature, an improved heating and control circuit comprising:

(a) an electronic timer of the type wherein a signal is provided at an output at a pre-set start time for an interval of time;

(b) a low voltage direct current source for control purposes;

(c) a relay including a relay coil and relay contacts, said relay contacts being in series with said heater control means and said power supply;

(d) a solid state device for closing said relay contacts at the pre-set brew start time and keeping said relay closed for a period of time longer or shorter than said interval of time, said solid state device having a control gate, the coil of said relay and said low voltage current source being in series relationship with said solid state device, and the output of said electronic timer being connected to the gate of said solid state device to provide a turn on signal to said solid state device, the impedance of said relay coil being sufficient to maintain the current through said solid state device above a level so that the solid state device keeps its conductive mode such that current will continue to flow through said solid state device and the relay coil from said control current source although the turn on signal is removed from said output after said interval of time whereby the relay remains latched after the turn on signal has been removed to permit said control means to continue to control said heater to maintain a desired liquid temperature; and (d) a manually operable selector switch in series with said solid state device and relay coil for opening the circuit from said solid state device to said relay coil to turn off the solid state device and open the relay contacts which shuts off power to the liquid heater.

9. In an automatic drip coffeemaker of the type having a container for receiving cold water at the start of a brewing operation, a carafe for receiving brewed coffee at the end of the brewing operation, a heater connected to a household electric power supply for pumping water from the container and for keeping brewed coffee warm after it has been brewed, and an electronic timer for starting a brewing cycle, an improved heating and control means comprising:
   (a) heater control means in series relationship with said heater for energizing said heater on and off to maintain a desired brewed coffee temperature;
   (b) a relay including a relay coil and relay contacts, said relay contacts being in series with said heater control means and said household power supply;
   (c) said electronic timer being of the type wherein a steady state low voltage output signal is provided at an output at a pre-set brew start time for an interval of time and wherein a low voltage rectified sine wave current source is provided for control purposes;
   (d) a triac for closing said relay contacts at the pre-set brew start time and keeping said relay switch closed for a period of time longer or shorter than the interval of time of the electronic timer output signal, said triac having a control gate, the coil of said relay and said low voltage current source being in series relationship with said triac, and said output of said electronic timer being connected to the gate of said triac to provide a turn on signal to said triac such that current will continue to flow through said triac and the relay coil from said low voltage source although the steady state low voltage output signal is removed after an interval of time whereby the relay remains latched after the signal has been removed to permit said heater control means to continue to control said heater to maintain a desired brewed coffee temperature; and
   (e) a selector switch in series with said triac and relay coil for turning off the triac and opening the relay contacts which shuts off power to the brewed coffee heater.

10. In a coffee maker, improved heating and control circuitry comprising:
   (a) a heater and a first switching means responsive to a relay coil and having a normally non-conductive state and a conductive state said switching means being in series circuit with said heater;
   (b) a control circuit for said switching means including an automatic brew state, an "off" state and a constant brew state;
   (c) said automatic brew state including electronic digital clock means, a semiconductor switching means having "on" and "off" states, a relay coil in series with said semiconductor switching means and means for turning said semiconductor to an "on" state for a predetermined time responsive to a signal from said electronic digital clock means, thereby actuating said relay coil and placing said first switching means in a conductive state; and
   (d) means for retaining said semiconductor switching means in a conductive state after said predetermined time for an additional undetermined time.

11. A coffeemaker as defined in claim 10 and wherein said means for retaining said semiconductor switch means in a conductive state after said predetermined time for an additional undetermined time comprises an LED in series with a resistor placed in parallel with said relay coil.

* * * * *